United States Patent Office 3,509,359
Patented Apr. 28, 1970

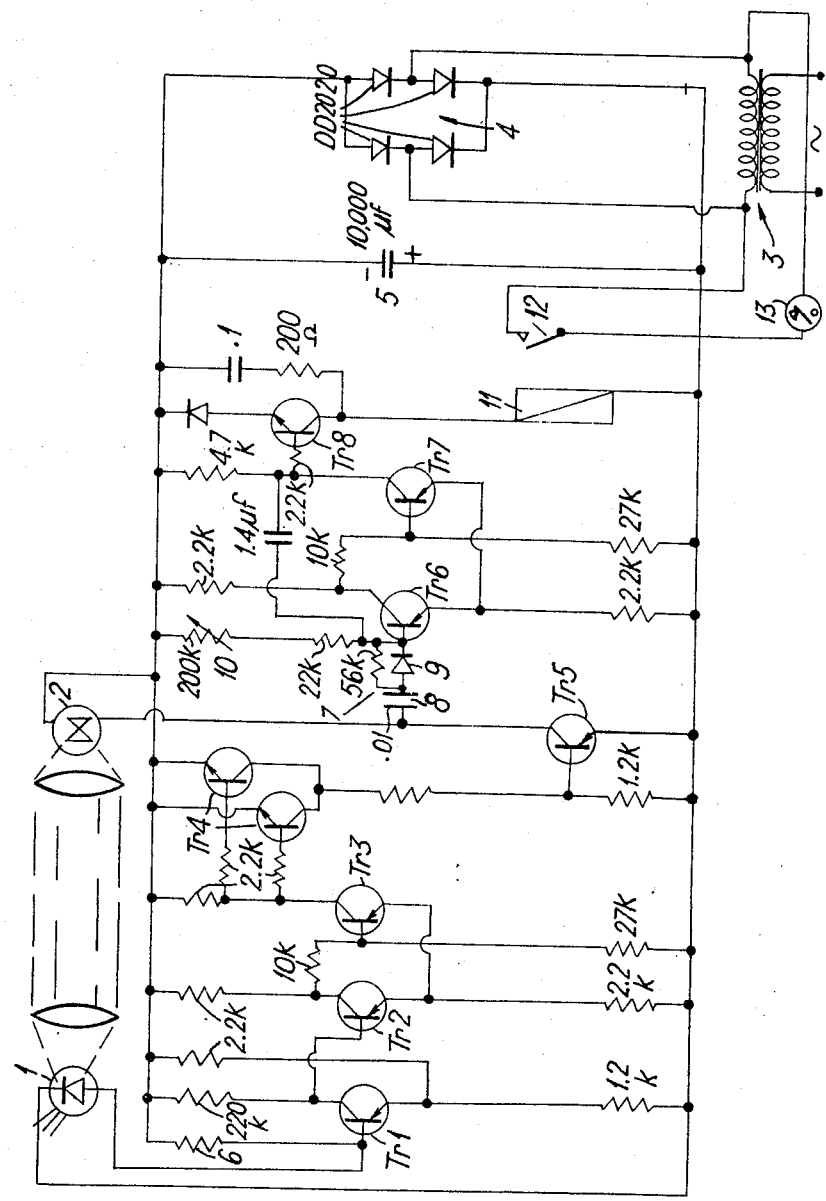

3,509,359
PHOTO-ELECTRIC OR SIMILAR CONTROL OR DETECTION DEVICES
Kenneth H. Embling, Caterham, England, assignor to Photain Controls Limited, Leatherhead, England, a corporation of Great Britain
Filed Apr. 3, 1967, Ser. No. 627,797
Claims priority, application Great Britain, Apr. 5, 1966, 15,049/66
Int. Cl. G08b 13/18; H01h 47/24
U.S. Cl. 307—117                                   5 Claims

ABSTRACT OF THE DISCLOSURE

A sensing device operated by a light or other radiation includes a light or like source and a sensitive element responsive to light or radiation received from said source and adapted to control the operation of said source to effect modulation or oscillation at a unique frequency. If there is any abnormality in the path between the source and the sensitive element oscillation is disturbed or stopped and a supervisory function is initiated. The oscillaton may be transmitted to a monostable trigger circuit having a natural period greater than the oscillation period so that the monostable circuit is held triggered but releases on failure of such oscillation due to abnormality in the path between the source and the sensitive element.

---

The present invention relates to radiation-responsive or similar control detection devices such as are used for a variety of purposes where the interruption of a radiation path is required to perform some control or warning function. Such requirements arise for example in connection with control systems for detecting the presence or absence of an object, for guard systems intended to prevent operation of a machine during loading, or for burglar alarm systems.

In such automatic control or detection systems, for which light is the type of radiation normally involved, rapid and reliable response to the interruption of the light path is required, while moreover the equipment should be substantially unaffected by local conditions of illumination; if another light source reaches the sensitive element the equipment should respond in the same way as if the light path were interrupted, and it should be designed to "fail safe" under unusual or non-standard conditions, that is to say, such conditions should evoke the same response as that obtained by interrupting the light path, and it should be understood that the equipment may have to function with infra-red or ultraviolet radiation.

The present invention is particularly directed to a photo-electric control system capable of fulfilling the above specified requirements and also having certain further advantages which will be apparent from the following description of a preferred embodiment of the invention.

The present application comprises a system in which the radiation from a source is modulated by utilizing the radiation received by a photo-electric or like device responsive to the radiation for controlling the emission of the radiation in such manner that there is a periodic interruption or fluctuation of the radiation, and the characteristics of the resulting oscillation are utilized for controlling the operation of a switching device, for example a relay, which performs a required circuit function under any abnormal conditions, for example on obstruction of the radiation path between the sensitive element and the source.

Preferably the interruption is at a rate substantially higher than the frequency of any stray radiation, for example due to local illumination by incandescent or fluorescent light sources operating at mains frequency. In a convenient application of the invention operating by transmitted light a photo-electric cell or other light-responsive element receives light from the light source and controls the operation of a circuit which in turn controls the light emitted by the light source. The light source and the photo-cell or the like may be screened by infrared or other filters.

In a convenient application of the invention a photo-electric cell, photo-diode, photo-transistor or the like is adapted to operate a trigger circuit which in turn operates a switching device which may be a solid state device regulating the energization of the light source. This assembly provides an oscillating circuit system in which the light source is modulated by a circuit controlled by the photo-cell or photo-diode or photo-transistor and the light beam provides a feed-back path, the operation being repeated at a comparatively high repetition rate which may conveniently be of the order of 2 kcs., that is to say well above the frequency of any ambient visual light which may fall on the photo-cell or photo-diode from other local light sources. The resulting oscillation is not substantially dependent on the distance between the light source and the photo-cell or photo-diode. Pulses derived from the oscillatory circuit are applied to a detection circuit, which may be monostable circuit the natural frequency of which is less than the pulse rate so that the monostable circuit is held in the triggered state so long as it receives the pulses but reverts to the quiescent state if no pulses are received. The relay or other switching device is connected to an output from the detection or monostable circuit.

It will be seen that if the light path between the source and the photo-cell is interrupted or abnormal conditions occur the oscillation of the circuit system stops or falls in amplitude and through the action of the monostable circuit causes or allows the relay to release and thus to perform the required function.

It will moreover be appreciated that the physical distance between the photo-cell or diode and the light source may be varied within a wide range without any change in the circuit operation or layout being necessary, since if the distance between the photo-cell or diode and the light source is increased and a greater light intensity is required, current is supplied to the source for a longer period of each cycle and a greater intensity of radiation is obtained without a substantial change in operating frequency. With this arrangement a long working life of the light source will be secured because it normally operates at a relatively low temperature.

The accompanying drawing shows a circuit diagram of one embodiment of the invention and illustrates a photodiode 1 and a light source 2 each provided with a lens and/or reflector system, the light path between them being also indicated. Power supply components are shown comprising a transformer 3 and a bridge rectifier 4 together with the usual smoothing capacitor 5 providing operating voltages for the light source and for a number of transistors which perform the following functions. The base of the transistor Tr1 receives an input from the photo-diode 1 and the latter receives an operating bias, if necessary, from the D.C. supply through a resistor 6, the value of which is chosen to suit the photo-diode 1. The output from the transistor Tr1 feeds a trigger circuit comprising transistors Tr2 and Tr3 which provides a trigger pulse from the transistor Tr3 for operating an amplifier transistor Tr4. For convenience two parallel connected transistors are shown. These amplifier transistors provide the input drive for a power transistor Tr5 which controls the illumination of the light source 2 which is connected in series with the collector of the transistor Tr5 across the direct current supply.

It will be seen that when the transistor Tr5 is switched on the brightness of the illumination from the source 2 starts to increase and increases the response from the photo-cell or photo-diode 1. Under normal operating conditions after a short period of increase in the illumination the trigger circuit formed by the transistors Tr2 and Tr3 becomes operative via the amplifier and power transistors Tr4 and Tr5 respectively to reduce the current received by the light source 2, so that the illumination now falls at a rate dependent on the properties of the circuit particularly the cooling rate of the light source 2. After a short further period the transistor Tr1 reverses the trigger circuit whereupon the transistor Tr5 is again switched on and the illumination of the souce 2 rises again. The overall result is that the components so far described operate as an oscillatory circuit providing a repetitive change or modulation in the illumination of the light source 2 which is dependent entirely upon the circuit characteristics and conveniently the frequency of this oscillation may be of the order of 2 kcs. This frequency and the phasing of the oscillations is unique in respect of each unit which is not responsive to local illumination or to the oscillation of any other similar adjacently placed unit of the same kind.

The oscillatory signal in the circuit of the source 2 is fed also to a pulse-shaping circuit including a coupling capacitor 8 and a resistor 7 shunted by a diode 9 and provides a pulse input to a monostable circuit formed by the transistors Tr6 and Tr7. The monostable circuit is designed so that the natural operating period between triggering and the return to the quiescent state is longer than the period of the input pulses. Hence the circuit remains triggered as long as pulses are received, that is as long as the photo-diode continues to be illuminated by the source 2. The transistor Tr6 receives a variable bias through a variable setting resistor 10 to adjust the monostable circuit for the required operating conditions.

The output from the monostable circuit feeds the base input of a relay-operating transistor Tr8 in series with the coil of a relay 11 having normally closed contacts 12 adapted to perform any appropriate signalling or control function. As shown by way of example the contacts 12 control the operation of a bell 13 energized from the secondary of the transformer 3 but of course the bell 13 may be replaced by any other control function, for example a relay or contactor arranged to stop an associated machine in a manner which will be apparent to anyone skilled in the art. The relay 11 is energized during normal operation of the circuit but in the event of any abnormality in the light path between the source 2 and the light sensitive element 1 the relay 11 releases and operates the bell 13 or performs some other circuit function. Thus the relay 11 is in the held position so long as oscillation continues with the photo-cell or diode 1 receiving modulated light in a regular manner from the light source 2. It (a) there is some abnormality in the light path (e.g. if steady light from a source other than lamp 2 is directed at the photo-sensitive element 1), or (b) such path is interrupted, oscillation stops or the amplitude falls, one of the trigger transistors Tr2 or Tr3 is made steadily conductive, and the transistor Tr5 is made continuously conductive or non-conductive, and the monostable circuit allows the relay 11 to release which then performs the required function.

The monostable circuit comprising the transistors Tr6 and Tr7 is so proportioned that under normal operating conditions, that is without abnormality in or interruption of the light path, a fresh pulse is received from the oscillatory circuit before the monostable circuit has returned to its quiescent condition and thus the monostable circuit remains in its operated condition and only returns to its quiescent condition when no pulses are received. On the other hand continuous illumination of the photo-diode 1 holds the other of the trigger transistors Tr2, Tr3 conductive and this prevents conduction of the transistor Tr5 so that again no oscillation occurs, the source 2 is not energized, the monostable circuit does not receive pulses and the relay is released. In general any abnormality or interruption in the light path will thus affect the amplitude of the oscillation or will stop such oscillation which in turn allows the monostable circuit to change its condition to exert some desired supervisory function represented by operation of the bell 13 or for example to stop an associated machine.

On the accompanying circiut diagram the usual bias and load resistors are provided and typical circuit values are indicated but since the components perform functions well-known to an electronic expert it has not been judged necessary to refer to them in detail.

Of course the light source and the photo-diode or like light sensitive device may be covered or protected by optical filter elements such as infra-red filters which screen off any light within the visible region, while the circuit is not limited to operation by light radiation as it may be utilized in conjunction with other types of radiation. An important advantage of the invention is that the circuit operates within reasonable limits irrespective of the physical distance between the light source and the photo-electric cell or diode and thus standard equipment may be utilized for a wide range of different installation conditions. The present invention is particularly valuable for the production of machine guards and similar purposes for preventing operation of the machine until the operator's hands are clear of moving parts of the machine, and such equipment may of course provide a plurality of light paths each extending between a light source and a photoelectric cell or diode.

What I claim is:

1. A detection system comprising in combination:
   (a) a first device having means for producing radiation in response to an energizing signal applied thereto, said radiation being of the type which travels on a line of sight such as exemplified by light waves,
   (b) a second device having means for producing a response signal as a result of radiation received thereby,
   (c) means mounting said first and second devices spaced apart along a predetermined path such that radiation from the first device is transmitted over said path to the second device,
   (d) means for normally supplying an energizing signal to said first device,
   (e) means for normally causing oscillations in said energizing and response signals, said latter means including means responsive to an increase in said response signal for reducing said energizing signal whereupon said radiation decreases and the response signal decreases to in turn increase said energizing signal and increase said radiation in a sustained series of oscillations, and
   (f) means coupled to receive and responsive to one of said signals for producing a final manifestation in the absence of oscillations in said one signal, such absence occurring when said path is interrupted even though said second device receives radiation from a source other than said first device.

2. The combination set forth in claim 1 further characterized in that said element (e) includes
   (e1) an amplifier having its input coupled to receive said response signal,
   and that said element (d) includes
   (d1) means coupled to receive the amplifier output for controlling the energizing signal supplied to said first device,
   and wherein the gain and phase shift of said amplifier, said first device, and said second device establish a predetermined frequency for the oscillations of said energizing and response signals.

3. The combination set forth in claim 1 further characterized in that said element (f) includes
  (f1) means for creating a pulse for each oscillation in said one of said signals, and
  (f2) means for producing said final manifestation whenever said pulses appear spaced apart in time by more than a predetermined amount, 4. The combination set forth in claim 2 further characterized in that said element (f) includes
  (f1) means for creating a pulse for each cycle of oscillation in the output of said amplifier,
  (f2) a monostable multivibrator triggered to the "on" state in response to each said pulse and having a reset period greater than the period of the oscillation frequency, and
  (f3) means for producing said final manifestation when said multivibrator is in its "off" or reset state.

5. A detection system comprising in combination:
  (a) an electric lamp which produces light in response to current supplied thereto,
  (b) a photo-sensitive element having a characteristic which increases in response to light received thereby,
  (c) means mounting said lamp and element spaced apart along a predetermined path so that light from the former normally is received by the latter,
  (d) circuit means for supplying current to said lamp,
  (e) means responsive to an increase in said characteristic of said element for controlling said circuit means to reduce said current, whereupon said light decreases to decrease said characteristic which in turn increases said current and said light in a sustained series of oscillations, and
  (f) means for producing a final manifestation in the absence of oscillations of said current or said characteristic.

References Cited

UNITED STATES PATENTS

| | | | |
|---|---|---|---|
| 2,193,789 | 3/1940 | Braselton | 250—205 |
| 3,214,640 | 10/1965 | Mills | 317—130 X |
| 3,225,304 | 12/1965 | Richards. | |
| 3,225,536 | 12/1965 | Reich | 331—66 X |
| 3,329,946 | 7/1967 | Robbins | 331—66 X |
| 2,631,273 | 3/1953 | Bagno | 340—228 |
| 3,437,822 | 4/1969 | Fitzsimmons | 250—218 |

FOREIGN PATENTS 616,360   3/1961   Canada.

LEE T. HIX, Primary Examiner

C. L. YATES, Assistant Examiner

U.S. Cl. X.R.

250—205; 317—125, 130, 146; 331—66; 340—228, 258